United States Patent
Shammoh

(10) Patent No.: US 8,544,793 B1
(45) Date of Patent: Oct. 1, 2013

(54) ADJUSTABLE ANGLE INLET FOR TURBOJET ENGINES

(71) Applicant: Ali A. A. J. Shammoh, Al-Adan (KW)

(72) Inventor: Ali A. A. J. Shammoh, Al-Adan (KW)

(*) Notice: Subject to any disclaimer, the term of this patent is extended or adjusted under 35 U.S.C. 154(b) by 0 days.

(21) Appl. No.: 13/736,891

(22) Filed: Jan. 8, 2013

(51) Int. Cl.
*B64D 33/02* (2006.01)

(52) U.S. Cl.
USPC .................................... 244/53 B; 137/15.1

(58) Field of Classification Search
USPC ................ 244/53 R, 53 B; 137/15.1, 15.2; 415/126, 127, 128, 150, 151, 159, 167
See application file for complete search history.

(56) References Cited

U.S. PATENT DOCUMENTS

| | | | | |
|---|---|---|---|---|
| 2,932,945 | A | * | 4/1960 | Brandt, Jr. ........................ 138/40 |
| 3,169,728 | A | * | 2/1965 | Langfelder et al. ......... 244/23 R |
| 4,383,407 | A | | 5/1983 | Inman |
| 4,449,678 | A | | 5/1984 | Hapke |
| 4,451,015 | A | | 5/1984 | Hapke |
| 4,667,900 | A | | 5/1987 | Kim |
| 4,763,858 | A | * | 8/1988 | Belisle et al. ............... 244/53 B |
| 5,031,836 | A | | 7/1991 | Ward |
| 6,089,505 | A | * | 7/2000 | Gruensfelder et al. ..... 244/53 B |
| 6,231,006 | B1 | * | 5/2001 | Gruensfelder et al. ..... 244/53 B |
| 6,260,567 | B1 | * | 7/2001 | Gruensfelder et al. ........... 137/1 |
| 6,910,327 | B2 | * | 6/2005 | Sakurai et al. .................. 60/204 |
| 8,402,739 | B2 | * | 3/2013 | Jain et al. ..................... 60/226.1 |
| 2005/0022866 | A1 | * | 2/2005 | Sakurai et al. ............... 137/15.1 |
| 2006/0107648 | A1 | | 5/2006 | Bulman et al. |

FOREIGN PATENT DOCUMENTS

GB 2162582 A * 2/1986

* cited by examiner

*Primary Examiner* — Joseph W Sanderson
(74) *Attorney, Agent, or Firm* — Richard C. Litman

(57) ABSTRACT

The adjustable angle inlet for turbojet engines provides for the adjustment of the nacelle inlet as the angle of attack of the aircraft changes. The adjustable inlet system thus assures that the nacelle inlet is always oriented directly into the relative wind as the angle of attack of the aircraft changes, e.g., during takeoff, landing, and high-G maneuvers where the aircraft reaches relatively high angles of attack. The adjustable angle inlet is adaptable to most turbojet-powered airplanes, but is particularly well suited for use with aircraft having their engines mounted on lateral pylons on the rear of the fuselage. The system operates according to signals received from an angle of attack sensor. The sensor controls an actuator, which rotates a shaft that is connected to the pivotally mounted inlet of the engine nacelle.

13 Claims, 4 Drawing Sheets

ADJUSTABLE ANGLE INLET FOR TURBOJET ENGINES

BACKGROUND OF THE INVENTION

1. Field of the Invention

The present invention relates generally to aeronautics, and particularly to an adjustable angle inlet for turbojet engines permitting the inlet portion of the engine cowling or nacelle to be adjusted according to the angle of attack of the aircraft.

2. Description of the Related Art

All aircraft that are dependent upon dynamic lift to maintain flight, e.g., fixed wing airplanes, helicopters, etc., generate that lift according to the angle of attack of the airfoil (wing or rotor blade) relative to the airflow over and around that airfoil. The amount of lift generated by an airfoil is proportional to the speed of the airfoil through the air and the angle of attack throughout normal flight attitudes, i.e., the angle of the airfoil relative to the angle of the approaching airflow. Thus, an airplane flying at relatively low speed must fly at a relatively high angle of attack to generate the required lifting force. This is readily seen during the takeoff and landing phases of flight, when an airplane is normally flying at its lowest speeds. However, high angle of attack flight can occur at higher speeds as well, particularly when maneuvering at relatively high airframe aerodynamic loads ("high G loading").

It will be seen that the relatively high angle of attack required for such slow speed flight not only affects the airflow around the wing of the airplane, but also affects the airflow around other aircraft components as well. Turbojet aircraft, in particular, are quite dependent upon smooth airflow into their engine nacelles in order for the engine(s) to operate optimally. Although not a frequent occurrence, from time to time a turbojet-powered aircraft will undergo sufficient disruption of the incoming air that the engine can no longer maintain proper flow through the engine. This results in what is known as a "compressor stall," in which at least some portion of the blades in the compressor section of the engine become stalled, i.e., they no longer accelerate the airflow through the compressor. This results in reduction or complete loss of power in the engine.

Accordingly, a great deal of effort has gone into alleviating or preventing compressor stalls. High angles of attack are unavoidable, as a jet airplane is required to operate at high angles of attack at the beginning and end of its flight. As a result, the overwhelming majority of work toward preventing compressor stalls in turbojet engines has been in the field of automated engine controls that react rapidly when changes in engine pressure ratio are detected that could indicate an incipient compressor stall. However, little, if any, prior work has been done toward providing smooth airflow into the engine inlet by adjusting the angle of the nacelle inlet as the aircraft angle of attack changes. Such a system could enable the engine to continue to produce power as desired, rather than resulting in a power reduction, as is often the case with automated controls.

Thus, an adjustable angle inlet for turbojet engines solving the aforementioned problems is desired.

SUMMARY OF THE INVENTION

The adjustable angle inlet for turbojet engines compensates for changes in angle of attack of the jet aircraft by changing the angle of the nacelle inlet to align at least generally with the direction of the free airstream flow. This provides a smooth transition for the airflow into the engine nacelle, thereby greatly alleviating or preventing engine compressor stalls due to the disruption of airflow into the inlet that might otherwise occur. The adjustable angle inlet may be applied to virtually any jet engine installation, but is particularly well adapted for use with engines mounted externally on the rear of the fuselage of a jet aircraft. This configuration, and also the wing pylon-mounted engine configuration, provides a reasonably aerodynamically "clean" engine nacelle configuration, wherein the incoming airflow is not subject to disruption by other structure immediately forward of the nacelle inlet.

The adjustable angle inlet for turbojet engines operates by means of a hydraulic (or alternatively, electric) actuator that operates a pinion gear shaft that is connected to the inlet portion of the nacelle. The actuator is preferably driven automatically, so that hydraulic pressure is supplied to the actuator in accordance with signals received from a conventional angle of attack indicator. As the angle of attack of the aircraft increases, the actuator pivots the inlet of the nacelle downward to face the oncoming airflow (relative wind) directly, rather than at an angle thereto. The airflow enters the nacelle inlet smoothly and is directed into the compressor section of the engine by the nacelle inlet, which acts as a guide or duct to control the direction of the airflow into the engine.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The adjustable angle inlet for turbojet engines allows the nacelle inlet angles to be adjusted for varying angles of attack in an aircraft having externally mounted engine nacelles, e.g., extending laterally from pylons mounted on the rear fuselage of the airframe. This provides for optimum inlet airflow during high angle of attack maneuvers, such as takeoffs, landings, and high-G maneuvers at higher speeds. The adjustable angle inlet aligns the incoming airflow with the compressor section of the turbojet engine, thereby alleviating or precluding compressor stall of the engine.

Figure 1A:
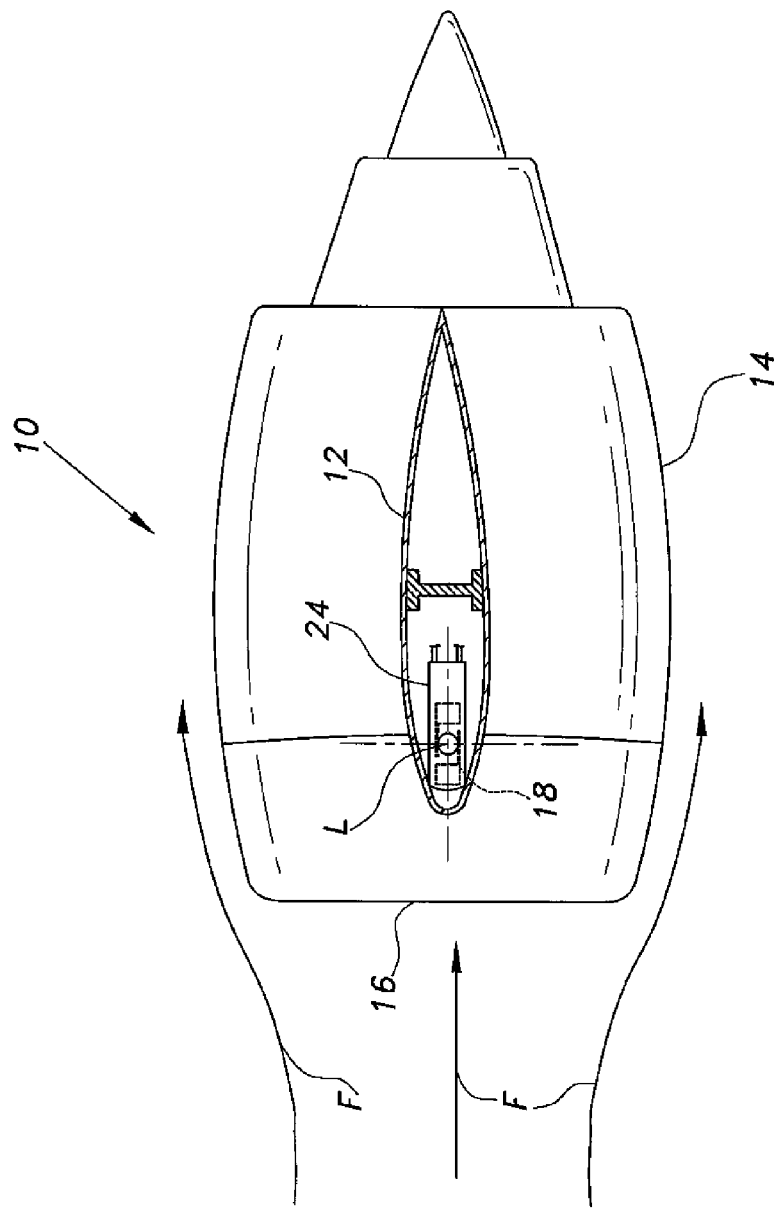
FIG. 1A is an environmental side view of a jet engine nacelle incorporating the adjustable air inlet for jet engines according to the present invention, the pylon being in section, showing the nacelle at a relatively low angle of attack.

FIG. 1A of the drawings is a left side elevation view of the of the right side turbojet engine nacelle 10, showing the nacelle as it would extend laterally from the right side engine mount pylon 12 (the pylon is shown in section in FIG. 1A). The nacelle 10 comprises a main portion 14 immovably affixed to the pylon 12, and the adjustable angle inlet 16 extends forward of the main nacelle portion 14. The inlet portion 16 is pivotally mounted to the main portion 14 of the nacelle 10, and pivots upon a pivot shaft 18 disposed through the lateral axis L at the rear of the inlet portion 16 of the nacelle 10. In FIG. 1A, the nacelle inlet portion 16 is shown aligned with the nacelle main portion 14, i.e., with zero angle of incidence between the two. This would normally be the case when the aircraft is flying at relatively high speed with a load of about one G, where only a relatively low angle of attack is required for cruise flight.

Figure 1B:
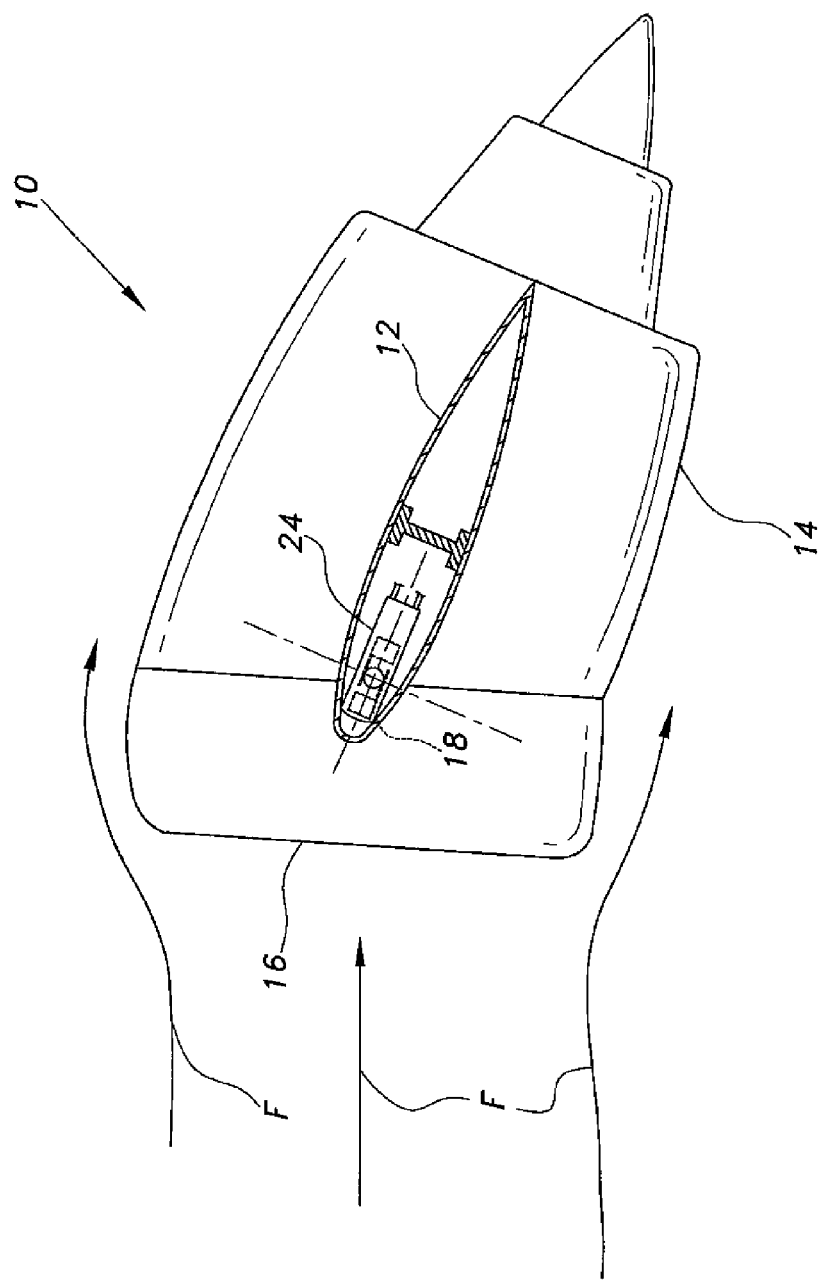
FIG. 1B is an environmental side view of a jet engine nacelle incorporating the adjustable air inlet for jet engines according to the present invention, the pylon being in section, showing the inlet of the nacelle angled to accept airflow at a relatively high angle of attack.

FIG. 1B of the drawings is similar to FIG. 1A, illustrating the nacelle 10 with its main portion 14 fixed to the pylon 12 and the adjustable inlet portion 16 extending forward from the main portion 14 of the nacelle 10. However, FIG. 1B represents the attitude of the aircraft at a relatively high angle of attack, i.e., when the aircraft (and its engine nacelles) are at some appreciable positive angle relative to the oncoming airflow or relative wind. In FIG. 1B, the inlet portion 16 of the nacelle 10 has been angled downward relative to the axis of the main portion 14 of the nacelle 10, to face the relative wind with little or no localized angle of attack as shown by the airflow lines F in FIG. 1B. The adjustable inlet 16 allows the inlet to be positioned or oriented to directly face the oncoming airflow at all times, thereby greatly reducing the potential hazard of compressor stall in the turbojet engine.

Figure 2:
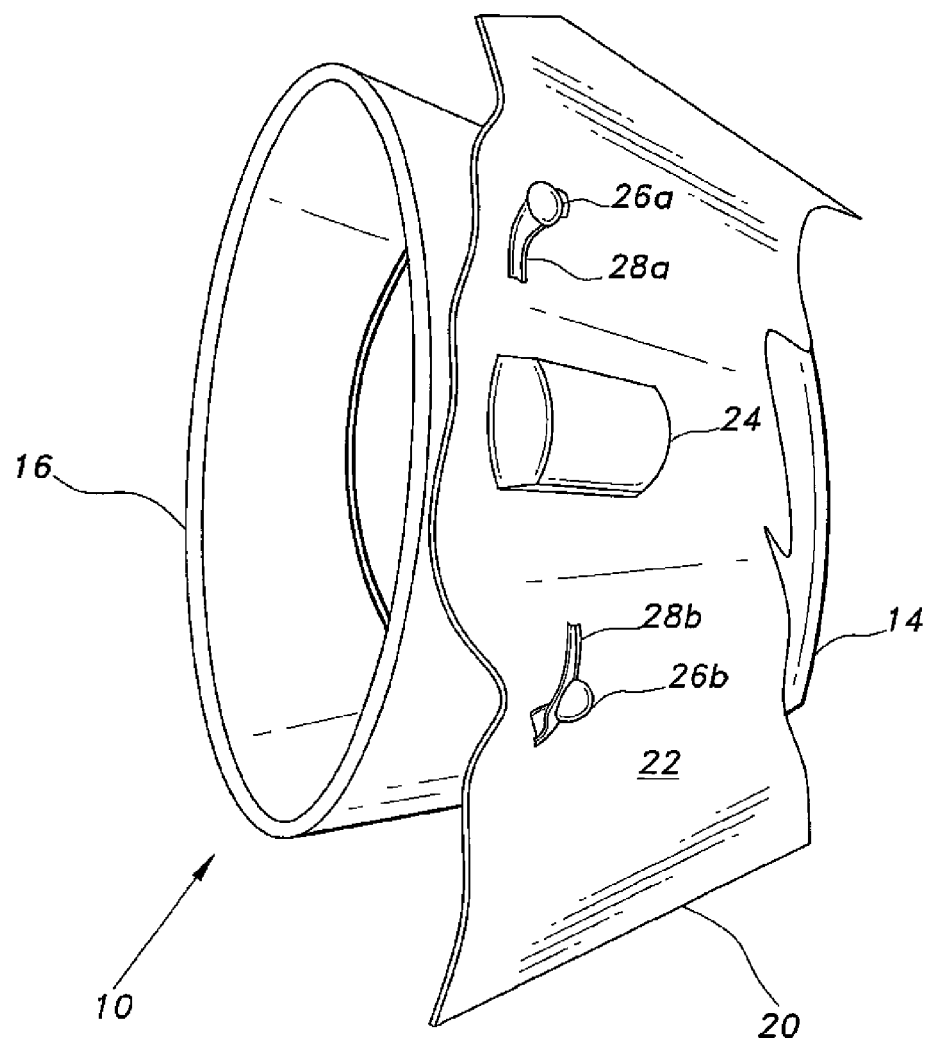
FIG. 2 is a partial perspective view of a portion of the fuselage of an aircraft having rear fuselage mounted jet engines, showing the basic control system for the adjustable air inlet for jet engines according to the present invention.

FIG. 2 is a partial perspective view illustrating the interior surface of a portion of the right side of the fuselage of an otherwise conventional jet aircraft to which the present adjustable angle inlet may be applied. The turbojet engine nacelle 10 extends outward from the fuselage portion or panel 20 to the opposite side of the depicted inner surface 22 of the panel 20. Accordingly, the engine mounting pylon affixed to the fuselage or airframe structure is concealed in FIG. 2, it being understood that the engine nacelle 10 is affixed to the engine pylon generally as shown in FIGS. 1A and 1B. FIG. 2 illustrates additional features of the adjustable nacelle inlet. An actuator 24 is installed upon the fuselage section 20 external to the nacelle 10 to drive an actuator shaft (described further below) to rotate the nacelle inlet 16 through a predetermined arc of travel in accordance with changes in the angle of attack of the aircraft. An up-limit pin 26a extends through an upper slot 28a in the fuselage section or panel 20, and a down-limit pin 26b extends through a lower slot 28b in the fuselage panel 20.

Figure 3:
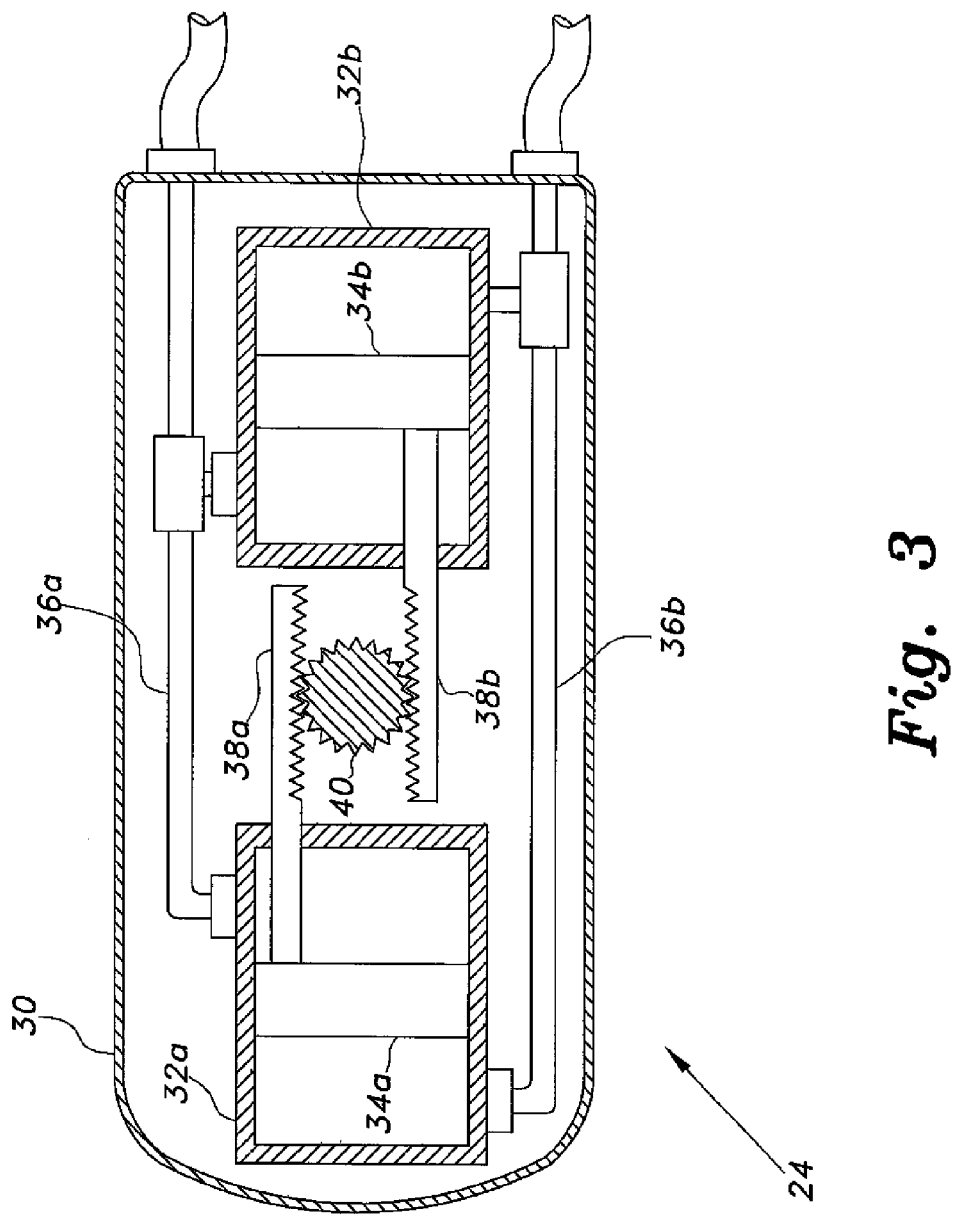
FIG. 3 is an elevation view in section of an actuator for the adjustable air inlet for jet engines according to the present invention, illustrating its internal structure.

FIG. 3 provides an elevation view in section of the actuator 24, showing its internal components and structure. The actuator 24 comprises a housing 30 containing mutually opposed first and second double-acting hydraulic cylinders 32a and 32b therein. First and second pistons 34a and 34b are installed in the two cylinders 32a, 32b, respectively, dividing each of the cylinders into two internal volumes. The internal volumes are provided with hydraulic fluid under pressure by first and second hydraulic lines 36a and 36b. The first hydraulic line 36a communicates with the two facing cylinder volumes or ends, and the second hydraulic line 36b communicates with the opposite distal volumes or ends of the two cylinders 32a and 32b.

Each piston 34a and 34b has a corresponding toothed rack 38a, 38b extending therefrom. The two toothed racks 38a and 38b extend through seals in the mutually facing bases of their cylinders 32a, 32b, and are axially offset from one another to capture a toothed pinion 40 therebetween. The nacelle inlet pivot shaft 18, shown in FIGS. 1A and 1B, extends directly from this toothed pinion gear 40, i.e., they are one and the same shaft 18, the toothed pinion gear 40 being on one end of the shaft 18. The shaft 18 is journaled into supports so that it cannot move forward or backward, but can only rotate. The shaft 18 extends from the actuator 24 through the pylon 12, and the adjustable inlet portion 16 is connected to the shaft 18 to pivot with rotation of the shaft 18. In the configuration illustrated in FIG. 3, pressure applied to the first hydraulic line 36a will result in the two pistons 34a, 34b being pushed away from one another, drawing the two toothed racks 38a, 38b apart. This results in counterclockwise rotation of the pinion gear 40. As the nacelle inlet pivot shaft 18 extends directly from the pinion gear 40, the adjustable nacelle inlet 16 will pivot downward to accommodate an increasing angle of attack by the aircraft, generally as shown in FIG. 1B. Release of hydraulic pressure in the first hydraulic line 36a and application of hydraulic pressure in the second line 36b will be seen to result in movement of the two toothed racks 3 8a, 3 8b toward their opposite cylinders, rotating the pinion gear 40 and its shaft 18 clockwise to drive the adjustable nacelle inlet 16 upward toward the position illustrated in FIG. 1A. The aircraft may have an angle of attack indicator connected to a suitable hydraulic valve or pump so that a change in the angle of attack automatically regulates the flow of hydraulic fluid to the cylinders 32a, 32b to pivot the adjustable inlet portion to always face the flow of air or relative wind.

Various alternative configurations may be provided. For example, the two toothed racks 38a, 38b may extend from the opposite sides of their respective pistons and cylinders, resulting in rotation of the pinion gear 40 and its shaft in the opposite direction from that described with pressure to each hydraulic line. The hydraulic lines may be reversed to feed opposite ends of the cylinders than shown in FIG. 3. Also, while a hydraulic system is shown and described, it should be noted that the adjustable nacelle inlet pivot shaft may be driven by an electric motor and suitable reduction gearing or torque multiplication, if desired.

It is to be understood that the present invention is not limited to the embodiments described above, but encompasses any and all embodiments within the scope of the following claims.

I claim:

1. An adjustable angle inlet for a turbojet engine of a turbojet powered aircraft, the aircraft including an airframe, the adjustable angle inlet comprising a turbojet engine nacelle having:
    a fixed main portion;
    an up-limit pin and a clown-limit pin extending from the inlet portion of the nacelle, each of the pins engaging a corresponding slot defined in the airframe of the aircraft; and
    an inlet portion pivotally attached to the fixed main portion about a lateral axis.

2. The adjustable angle inlet for a turbojet engine according to claim 1, further comprising an actuator disposed external to the nacelle, the actuator communicating mechanically with the inlet portion of the nacelle.

3. The adjustable angle inlet for a turbojet engine according to claim 2, further comprising:
    a pivot shaft extending laterally from the inlet portion of the nacelle;
    a pinion gear mounted on the pivot shaft, the actuator selectively rotating the pinion gear.

4. The adjustable angle inlet for a turbojet engine according to claim 3, further comprising:
    mutually opposed first and second cylinders disposed within the actuator;
    a piston disposed within each of the cylinders; and
    a toothed rack extending from each of the pistons, each of the racks engaging the pinion gear of the pivot shaft.

5. The adjustable angle inlet for a turbojet engine according to claim 2, wherein the actuator is hydraulically powered.

6. The adjustable angle inlet for a turbojet engine according to claim 1, wherein the inlet portion of the nacelle extends forward of the fixed main portion, the inlet portion being angularly adjustable relative to the fixed main portion according to the angle of attack of the turbojet powered aircraft, the adjustable angle inlet further comprising an engine mount pylon immovably affixed to and extending from the airframe of the turbojet powered aircraft, the turbojet engine nacelle being mounted on the pylon.

7. An adjustable angle inlet for a turbojet engine of a turbojet powered aircraft, the aircraft including an airframe, the adjustable angle inlet comprising a turbojet engine nacelle, having:
- a fixed main portion;
- an inlet portion pivotally mounted forward of the fixed main portion, the inlet portion being angularly adjustable relative to the fixed main portion about a lateral axis;
- an up-limit pin and a down-limit pin extending from the inlet portion of the nacelle, each of the pins engaging a corresponding slot defined in the airframe of the aircraft; and
- an actuator disposed external to the nacelle, the actuator communicating mechanically with the inlet portion of the nacelle.

8. The adjustable angle inlet for a turbojet engine according to claim 7, further comprising a pivot shaft extending laterally from the inlet portion of the nacelle, the pivot shaft including a pinion gear mounted thereon, the actuator selectively rotating the pinion gear.

9. The adjustable angle inlet for a turbojet engine according to claim 8, further comprising:
- mutually opposed first and second cylinders disposed within the actuator;
- a piston disposed within each of the cylinders; and
- a toothed rack extending from each of the pistons, each of the racks engaging the pinion gear of the pivot shaft.

10. The adjustable angle inlet for a turbojet engine according to claim 7, wherein the actuator is hydraulically powered.

11. The adjustable angle inlet for a turbojet engine according to claim 7, further comprising an engine mount pylon immovably affixed to and extending from the airframe of the turbojet powered aircraft, the turbojet engine nacelle being disposed upon the pylon, the inlet portion being angularly adjustable relative to the fixed main portion according to the angle of attack of the turbojet powered aircraft.

12. An adjustable angle inlet for a turbojet engine of a turbojet powered aircraft, the aircraft including an airframe, the adjustable angle inlet comprising:
- an engine mount pylon immovably affixed to and extending from the airframe of the turbojet powered aircraft;
- a turbojet engine nacelle disposed upon the pylon, the nacelle having:
- a fixed main portion; and
- an inlet portion extending forward of the fixed main portion;
- an actuator adapted for mounting within the airframe;
- a shaft extending from the actuator through the pylon to the nacelle, the inlet portion of the nacelle being pivotally connected to the shaft so that rotation of the shaft angularly adjusts the inlet portion relative to the fixed main portion;
- an up-limit pin and a down-limit pin extending from the inlet portion of the nacelle, each of the pins engaging a corresponding slot defined in the airframe of the aircraft; and
- means for rotating the shaft in order to adjust the angle of the inlet portion to align the inlet portion with airflow as the aircraft's angle of attack changes.

13. The adjustable angle inlet for a turbojet engine according to claim 12, wherein said actuator comprises:
- first and second double-acting hydraulic cylinders, each of the hydraulic cylinders having a piston and a rack gear extending from the piston, the rack gears extending towards each other axially and retracting away from each other, the rack gears being laterally spaced and facing each other;
- a pinion gear mounted on said shaft, the pinion gear being mounted between the rack gears of the first and second hydraulic cylinders, the pinion gear engaging the rack gears so that said shaft rotates clockwise when hydraulic fluid is forced on one side of the pistons, and rotates counterclockwise when hydraulic fluid is forced on the opposite side of the pistons, thereby angularly adjusting the inlet portion of said nacelle.

\* \* \* \* \*